United States Patent Office 3,033,877
Patented May 8, 1962

3,033,877
BIOLOGICALLY ACTIVE COMPOUNDS AND PROCESS OF PREPARING SAME
Willem Louis Constantijn Veer, Oss, Netherlands, assignor to Organon Inc., West Orange, N.J., a corporation of New Jersey
No Drawing. Filed Jan. 5, 1959, Ser. No. 784,871
Claims priority, application Netherlands Feb. 21, 1957
10 Claims. (Cl. 260—345.8)

This application is a continuation-in-part of my copending application Serial Number 680,616, filed August 27, 1957, now abandoned which in turn is a continuation-in-part of my application Serial Number 571,127, filed March 13, 1956, now abandoned.

This invention relates to new valuable chemical compounds which can be derived from substances occurring in parts of the plants of the Oleacae family.

More particularly the invention relates to the preparation of compounds having the general formula:

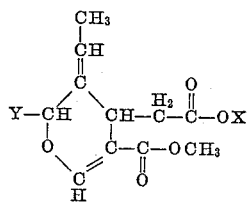

in which X is selected from the group consisting of hydrogen, ammonium, sodium, potassium, zinc, calcium, magnesium, ferrous iron, lower alkyl radicals and, together with Y, a lactonic bond and
Y is selected from the group consisting of the hydroxyl radical, lower alkoxy radicals, and, together with X, a lactonic bond.

The group Y can occur in two configurations, in one of them this group extends above the plane of the ring system while in the other configuration this group extends below this plane. When the compounds in which Y is a hydroxyl group are dissolved in an aqueous medium, there exists an equilibrium between the two configurations, these two configurations passing into each other. In the compounds in which Y is an alkoxy group the two configurations are stable and can be isolated.

The compound in which X is hydrogen and Y is the hydroxyl radical is hereinafter designated as elenolic acid, while the salts and esters of this acid are designated as elenolates, while the lactone of elenolic acid in which X and Y in the above formula together represent a lactonic bond is designated as elenolide.

These compounds exhibit the property of producing a hypotensive effect both in human beings and animals. Such hypotensive effect is indicated by action which causes a gradual and prolonged fall of blood pressure. In contradistinction to the hypotensive compounds which are heretofore isolated from parts of olive plants the hypotensive effect of which only lasts for a few minutes, the present compounds exert a hypotensive effect which may last for many hours. The present compounds further exhibit a sedative and tranquillizing effect in experimental animals and in some cases of mental disease.

All of the above compounds show hypotensive actions. Dependent on the objective and the mode of administration, a choice can be made from the above group of compounds. For preparations meant for injection e.g. preferably a water-soluble compound is chosen, such as calcium elenolate.

The preparation of an elenolic acid-containing concentrate is carried out by extracting the parts of plants of the Oleaceae family, such as for example, the bark, the leaves, the roots, and the fruits or an aqueous or water miscible organic solvent extract, such as an alcoholic extract, obtained from these parts of plants or the press juice of olives liberated from oil with a non-water miscible organic liquid, such as chloroform or ether, after which the neutral constituents are separated from the resulting extract as a result of which a relatively pure concentrate of elenolic acid is obtained.

The parts of the plants can be processed right after the harvest or the collection. The starting material may also be left to stand for a few days in which period a natural fermentation occurs.

The yield of the concentrate of elenolic acid can be raised by subjecting an aqueous or alcoholic extract of the parts of plants, or the press juice, to a mild hydrolysis before extraction with a non-water miscible organic solvent, for which purpose use may be made of an organic acid, such as acetic acid, butyric acid, succinic acid, and citric acid, or an inorganic acid, such as phosphoric acid, hydrochloric acid, and sulphuric acid. In the hydrolysis, use may also be made of a cation exchanger of the acid type to avoid harmful side reactions.

In the preparation of the compounds according to the invention use is preferably made of parts of the *Olea europaea*. However, also parts of other plants belonging to the Oleaceae family, such as privet varieties, may be used as starting materials. Any part of the plants in question may be used. Of the *Olea europaea* especially the ripe fruits give a higher yield than the other parts. A particularly suitable starting material is the press juice liberated from oil which becomes available in the preparation of olive oil. Unlike the parts of plants this starting material is largely available, while the isolation of the active substances herefrom can take place in a simpler manner than from parts of plants. Briefly the processing of the said starting materials is carried out as follows. A concentrate containing elenolic acid is prepared from the parts of plants, after which this concentrate is processed, if desired, to the functional derivatives of the elenolic acid in question.

The separation of the said neutral constituents can for example be carried out by extracting the solution, obtained in the extraction with a non-water miscible organic solvent, with an aqueous solution of an alkaline reacting substance, in which the elenolic acid dissolves by the formation of a salt. After separating the aqueous layer the latter is acidified and elenolic acid is extracted with a non-water miscible solvent. The separation of the neutral constituents is preferably carried out as follows. The extract is evaporated to dryness and the residue is taken up in water, after which so much bicarbonate is added until the pH has reached a value of between 7 and 7.5, and in addition a quantity of e.g. 5–10% of a water soluble salt. This salt reduces the solubility of the neutral constituents and of elenolic acid in water, as a result of which the subsequent extractions proceed more effectively. Subsequently the aqueous liquid is extracted with a non-water miscible liquid, such as chloroform or ether, in which the neutral constituents dissolve. After separation of the layer containing the neutral constituents, the aqueous layer is acidified and then the elenolic acid is extracted herefrom with a non-water miscible liquid, such as chloroform or ether.

The concentrate of elenolic acid can now be converted in a simple manner into derivatives of elenolic acid. The preparation of these derivatives will be discussed hereinafter.

(a) *Elenolide*.—The lactone of elenolic acid, elenolide, can be prepared from elenolic acid by a dehydration reaction. This reaction can be carried out by heating the concentrate of elenolic acid at a temperature above 150° C. In addition a concentrate of elenolic acid can be treated with a dehydrating agent, such as ethoxy acetylene.

The product to be dehydrated may also be dissolved in a high-boiling solvent capable of forming an azeotropic mixture with water, after which the solution is heated to the boiling point. Then a mixture of water and the solvent distills until the dehydration reaction is completed. As an example of a solvent suitable for this purpose there may be mentioned tetralin. The dehydration may also be carried out by heating in the presence of a dehydrating catalyst, such as phosphoric acid and thorium oxide.

A very simple method for the preparation of elenolide is the one in which the extract from which the neutral constituents have not yet been removed is directly subjected to a distillation in vacuo, the fraction distilling between 120 and 160° C. at a pressure of 0.1 mm. mercury being collected. From this distillate elenolide can be obtained in a simple manner, namely either by dissolving it in e.g. warm alcohol from which the elenolide crystallizes on cooling, or by the addition of ether to the distillate. It is recommendable before distillation to further purify the said extract from which the neutral constituents have not yet been removed. However, this is not necessary. This further purification can e.g. be carried out by extracting the extract in question with water and shaking out the aqueous solution with ether. The ethereal solution is then evaporated to dryness after which the residue is distilled. It is also possible, to remove the neutral constituents from this residue in the above described manner and to carry out the distillation with the resulting concentrate of elenolic acid.

The elenolide may be used as such as active constituent in hypotensive preparations, it may also be used for the preparation of functional derivatives of elenolic acid. By reaction with water elenolide can be reconverted into elenolic acid.

(b) *Salts of elenolic acid.*—The salts of elenolic acid can be prepared by reacting elenolic acid or concentrates thereof with a basic compound, such as the hydroxide, carbonate or bicarbonate of the desired metal or of ammonium.

As a metal or ammonium compound there is preferably chosen the carbonate. Herewith the salt is formed with the evolution of carbon dioxide. By applying a small excess of the carbonates, one has the advantage that the pH remains above 6 which is highly desirable as at a lower pH undesirable conversions of elenolic acid may occur.

A great advantage in the preparation of calcium, zinc, magnesium, and ferro-elenolates when using the carbonates in question is that an excess of carbonate can be added to the elenolic acid-containing liquid, after which, when the salt has been formed, this excess can be removed again in a simple manner by filtration and the elenolate can subsequently be obtained from the solution by evaporation.

Elenolic acid can also be formed in situ, i.e. by starting from elenolide. This occurs in the presence of water which converts elenolide into elenolic acid.

In addition to the metal compounds mentioned by name, salts may naturally also be made using other metal compounds, which, under the conditions of the reaction, are capable of reacting with elenolic acid.

(c) *Acetals of elenolic acid.*—The acetals of elenolic acid and lower aliphatic alcohols are prepared by subjecting the acetals of the esters of elenolic acid, which can be prepared in the manner as described hereinafter to hydrolysis in an alkaline medium. By this hydrolysis the ester is saponified to the carboxylic acid.

These acetals of elenolic acid, each occur in two stereoisomeric configurations dependent on the configuration of the group X. The mixture of acetals of esterified elenolic acid used as starting material, can first be separated into the two components. Then each component gives one of the acetals of elenolic acid.

The acetals of elenolic acid can be applied as active constituents in preparations with hypotensive actions.

(d) *Acetals of esterified elenolic acid.*—These acetals can be obtained by reacting elenolide with a lower aliphatic alcohol in the presence of a catalyst applied in acetalisation reactions and separating the acetal in question from the reaction mixture. By this reaction the lactone ring present in elenolide is opened, while esterified and acetalised elenolic acid is formed.

As a catalyst use may be made of any catalyst used in acetalisation reactions, such as hydrochloric acid, paratoluenesulphonic acid, and a cation exchanger in the acid form.

The reaction is preferably carried out in a solution of the alcohol in question to which, if desired, a quantity of water may be added.

The resulting products are invariably mixtures of two stereoisomers which can e.g. be isolated in a pure form by fractional crystallization from various solvents.

The acetals of esterified elenolic acid and notably the methyl and ethyl compounds can be applied as active constituents in preparations with hypotensive actions. They may also be used for the preparation of acetals of elenolic acid. This preparation is described above.

The production of pharmaceutical preparations under application of elenolic acid or functional derivatives thereof can be performed by mixing one or more of these compounds with excipients commonly used for those preparations. The preparations are preferably produced in a form suitable for oral administration, such as solid dosage units (pills, tablets or capsules), solutions or suspensions. The water-soluble compounds may also be dissolved in an aqueous liquid suitable for injection, to produce preparations which are suitable for parenteral administration. It is also possible to incorporate one or more of the active compounds in suppositories.

It is desirable to provide the solid preparations to be administered orally with a coating layer which is resistant against the action of gastric acid. The active compounds are thus released only in the intestine as a consequence of which the chance is precluded that in highly sensitive subjects inclinations to vomit occur. The coating layer may consist of any substance suitable for this purpose, such as stearic acid, cellulose-acetate-phthalate or shellac.

The following examples are illustrative of the invention. It is understood, however, that the invention is not to be limited to the specific disclosures of these examples.

EXAMPLE I

Concentrate of Elenolic Acid 250 kg. of leaves of the *Olea europaea* are boiled three times with 1,000 l. of ethanol. The alcoholic extract is evaporated in vacuo, after which the residue is stirred with 320 l. of water of 65° C. Centrifugation after cooling. After the addition of 30 kg. of the cation exchanger Dowex 50 in the acid form the centrifuged liquid is boiled for 3 hours, after which 4 extractions are carried out with each time 50 l. of chloroform. The chloroform extract is evaporated in vacuo to dryness after which the residue is extracted 5 times with each time 2 l. of boiling water. The combined aqueous extracts are extracted with ether, after which the ether is evaporated. The residue weighs 490 g. To 200 g. hereof 1 liter of boiling water is added. In small portions 51 g. of sodium bicarbonate and then 150 g. of sodium chloride are added to the cooled homogeneous solution. The pH of the solution amounts to 7.3. Extraction with chloroform yields the neutral constituents as they are soluble in this solvent. The remaining aqueous layer is acidified to pH 2.5 by the addition of hydrochloric acid, and extracted with chloroform. After drying the chloroform layer over sodium sulphate and evaporating the solvent, 114 g. of an oily residue are obtained.

The infrared spectrum determined in methylene chloride solution is identical with that of the product obtained by reacting crystalline elenolide with water. It may therefore be concluded that the oily residue consists for the greater part of elenolic acid.

EXAMPLE II

Concentrate of Elenolic Acid

To 1,100 l. of press juice obtained by pressing ripe olives and separating the oil are added 14 l. of 85% phosphoric acid. Boiling for 3 hours, after which the mixture is extracted two times with each time 200 l. of chloroform. The chloroform extract is evaporated to dryness in vacuo. Filtration after the addition of 50 l. of water. A little oil is separated from the filtrate. The remaining aqueous solution is neutralized to pH 7.3 by the addition of sodium hydroxide.

After the addition of 10 kg. of sodium chloride the neutral constituents are removed by extraction with 35 l. of chloroform and separating the chloroform layer. The aqueous layer is acidified to pH 2.5. Extraction with ether, followed by evaporation of the solvent yields 494 g. of an oily residue, which as well as that obtained according to Example I, consists for the greater part of elenolic acid.

EXAMPLE III

Elenolide 60 kg. of ripe olives are boiled with 60 l. of water. The aqueous extract is separated and the residue is subsequently boiled once again with an equal quantity of water. The aqueous extracts are combined and centrifuged and the olive oil is separated. Then the aqueous solution is evaporated to dryness in vacuo. The thus obtained residue is treated with 12 l. of acetone. The residue which does not dissolve is treated another 2 times with each time 15 l. of acetone. The acetone extracts are combined and evaporated to dryness in vacuo. While stirring the thus obtained residue is heated to the boiling point of the mixture in 600 ml. of water, after which the liquid is filtered. The filtrate is extracted with chloroform. The chloroform layer is evaporated to dryness in vacuo and the residue is extracted with 500 ml. of hot water and filtered. The residue which remains behind on the filter is extracted another few times with hot water, after which the aqueous extracts are combined and shaken out with ether. The ethereal solution is separated and dried over sodium sulphate, after which the solvent is evaporated in vacuo. The resulting residue is distilled in vacuo.

The fraction which distills between 120 and 160° C. at a pressure of 0.1 mm. mercury is collected. It is a viscous pale-yellow oil. While heating this oil is dissolved in 50 ml. of alcohol, from which, after cooling, elenolide separates in the form of needle-shaped crystals. These crystals melt at 147–150° C.; after recrystallization from alcohol the M.P. is 153–155° C. Dissolved in acetone elenolide shows an an $(\alpha)_D^{21}$ of $+367°$ and dissolved in chloroform an $(\alpha)_D^{21}$ of $+369°$. Dissolved in absolute alcohol it shows an absorption spectrum with maxima at 225 and 317 m$\mu$ (log$_e$ 4.29 and 1.75 resp.). Dissolved in methylenechloride it shows an infrared spectrum with bands at 3.42, 3.54, 5.58, 5.85, 5.94, 6.04, 6.08, 7.24, 7.50, 8.49, 8.82, 9.15, 9.63, 9.92, 10.32, 10.82, and 12.25$\mu$.

EXAMPLE IV

Elenolide

From 4 kg. of olive leaves an extract is prepared by extracting them with boiling alcohol. The alcoholic extract is evaporated to dryness in vacuo and the residue is extracted with 3 l. of water. After filtration and centrifugation 450 g. of a cation exchanger in the acid form is added to the aqueous extract, after which the mixture is boiled for 6 hours while stirring. Then the liquid is decanted and the cation exchanger is extracted with chloroform. The aqueous liquid is likewise extracted with chloroform. The chloroform extracts are combined and evaporated to dryness in vacuo, after which the residue is extracted with hot water. The further processing of the resulting aqueous solution to elenolide is carried out in the same manner as described in Example III. Other lower halogenated hydrocarbons, ethers and lower aromatic hydrocarbons may be used instead of chloroform.

EXAMPLE V

Elenolide 160 l. of press juice obtained from ripe olive fruits is left to stand for fermentation for 3 days, after which it is extracted 3 times with 40 l. of chloroform. The chloroform extract is freed from the neutral constituents in the manner as described in Example I, 65 g. of sodium bicarbonate being used. Obtained are 132 g. of a concentrate of elenolic acid. To a solution of 50 g. of ethoxy acetylene in 500 ml. of dry ethyl acetate which is refluxed while excluding moisture, a solution of 5.15 g. of the concentrate in 500 ml. of ethyl acetate is added dropwise. Then boiling is continued for another 30 minutes. The solvent is evaporated, after which crystallization is brought about by the addition of 6 ml. of ether and cooling to 0° C. Obtained is 0.35 g. of elenolide.

EXAMPLE VI

Elenolide 50 g. of the concentrate containing elenolic acid obtained according to Example I is heated to 190–200° C. in a nitrogen atmosphere at a pressure of 4 mm. Hg. After the addition of 100 ml. of ethanol and cooling to 0° C. elenolide crystallizes. Obtained are 2.9 g. of crude elenolide, M.P. 145–150° C. Recrystallization from ethanol yields pure elenolide of M.P. 153–155° C.

EXAMPLE VII

Elenolide 5.8 g. of the concentrate of elenolic acid prepared according to Example II is heated to 200–235° C. at a pressure of 0.05 mm. of Hg for 20 minutes after the addition of 50 mg. of thorium oxide. After the addition of 3 ml. of ethanol, filtration and crystallization at 0° C., 0.52 g. of elenolide is obtained.

EXAMPLE VIII

Elenolide 5 g. of the concentrate of elenolic acid described in Example I are boiled for 45 minutes with 40 ml. of tetralin in an apparatus equipped with a water entrainer, after which the tetralin is evaporated at a pressure of 0.1 mm. Hg. After the addition to the residue of 2 ml. of ether, the mixture is left to stand for crystallization at −10° C. In this manner 75 mg. of elenolide are obtained.

EXAMPLE IX

Elenolide 100 mg. of 85% phosphoric acid are added to 9.7 g. of the concentrate prepared according to Example II, after which the mixture is heated at 180–200° C. at a pressure of 5 mm. Hg for 20 minutes. Addition of ether and crystallization at 0° yields 750 mg. of elenolide.

EXAMPLE X

Calciumelenolate 5 g. of elenolide are refluxed for 15 minutes with 250 ml. of water and 1.25 g. of calcium carbonate. After filtration the reaction mixture is evaporated to dryness. If desired the product can be purified by recrystallization from water. Obtained is crystalline calcium elenolate in the form of rosette-like needles: absorption spectrum in absolute alcoholic solution: maximum at 237 m$\mu$;

$\log_e = 4.30$; elemental analysis: carbon 50.51% and 50.44%, hydrogen 5.37% and 5.32%, calcium 7.62% and 7.70%. The calculated values for the formula $$(C_{11}H_{13}O_6)_2Ca$$

are 50.57%, 5.02% and 7.67%, respectively.

EXAMPLE XI

Magnesium Elenolate 100 mg. of elenolide are boiled with 5 ml. of water for 15 minutes. Subsequently 17 mg. of magnesium carbonate are added after which the mixture is stirred at room temperature for one hour. After filtration the reaction mixture is extracted with chloroform. The aqueous layer is evaporated to dryness in vacuo. In this manner magnesium elenolate is obtained of the formula $$(C_{11}H_{13}O_6)_2Mg$$

absorption spectrum in absolute alcoholic solution: maximum at 237–238 m$\mu$, $\log_e = 4.30$.

EXAMPLE XII

Zinc Elenolate 1 g. of elenolide is boiled with 50 ml. of water for 20 minutes, after which the resulting solution is extracted with chloroform. The chloroform extract is evaporated to dryness in vacuo. The syrupy residue is dissolved in 50 ml. of ethanol. Refluxing for 2 hours after the addition of 190 mg. of zinc oxide. Subsequently the reaction mixture is evaporated after filtration. Obtained is zinc elenolate of the formula $(C_{11}H_{13}O_6)_2Zn$.

The absorption spectrum in absolute alcoholic solution shows a maximum at 236 m$\mu$; $\log_e = 4.30$.

EXAMPLE XIII

Ammonium, Sodium, and Potassium Elenolates 200 mg. of elenolide are boiled with 10 ml. of water for 15 minutes. The resulting solution is neutralized by the careful addition of ammonium hydroxide. After evaporation to dryness ammonium elenolate of the formula $C_{11}H_{13}O_6(NH_4)$ is obtained. In the same manner, this time, however, making use of sodium hydroxide and potassium hydroxide, respectively, sodium and potassium elenolates are prepared.

EXAMPLE XIV

Sodium Elenolate 74 mg. of elenolide are boiled with 4 ml. of water and 27 mg. of sodium bicarbonate for 5 minutes. After extracting the aqueous layer with chloroform the former is evaporated to dryness in vacuo, which affords sodium elenolate of the formula $C_{11}H_{13}O_6Na$.

The absorption spectrum in absolute alcoholic solution shows a maximum at 237 m$\mu$, $\log_e = 430$.

EXAMPLE XV

Ferro-Elenolate 224 mg. of elenolide are boiled with 10 ml. of water and 90 mg. of ferrous oxide for 20 minutes. After filtration the filtrate is evaporated to dryness in vacuo. In this manner ferrous elenolate is obtained of the formula $$(C_{11}H_{13}O_6)_2Fe$$

EXAMPLE XVI

Calcium Elenolate 40 g. of a concentrate of elenolic acid, obtained by extracting leaves of the *Olea europaea* in the manner of Example I with a non-water miscible organic solvent and subsequently separating the neutral constituents from the resulting extract, are boiled with 500 ml. of water.

Some undissolved impurities are removed by means of decantation and filtration.

After the addition of norit the filtrate is boiled and filtered. To the thus obtained pale-yellow filtrate 9.5 g. of calcium carbonate are added, after which the mixture is boiled for 45 minutes. After filtration the reaction mixture is evaporated in vacuo to a small volume, whereby crude calcium elenolate crystallizes (17.5 g.). After recrystallization from water the pure compound is obtained which, according to the X-ray powder diagram, is identical with the compound obtained according to Example X.

EXAMPLE XVII

Calcium Elenolate 20 g. of a concentrate of elenolic acid, obtained in the manner as described in Example II, are boiled with 250 ml. of water. After filtration and treatment with norit in the manner of Example XVI 6 g. of calcium carbonate are added after which the mixture is stirred for 5 hours. After filtration and evaporation in vacuo to a small volume crude calcium elenolate is obtained (7 g.).

EXAMPLE XVIII

Methyl-O-Methyl Elenolates 6.02 g. of elenolide are dissolved in 500 ml. of absolute methanol. To this solution are added 12 ml. of the same solvent containing 10 mg. of hydrogen chloride per ml. After the mixture has been left to stand at room temperature for 4.5 hours, 284 mg. of sodium bicarbonate are added, after which the solution is evaporated to dryness in vacuo. Dry ether is added to the residue and the thus obtained mixture is filtered. The filtrate is evaporated to dryness in vacuo. To the thus obtained oily residue 2 ml. of petroleum ether are added after which the mixture is left to stand in the refrigerator for about 12 hours. To the mass which has then almost completely crystallized 70 ml. of a mixture of ether and petroleum ether (1:1) are added. After filtration the filtrate is evaporated to a volume of about 35 ml. Crystallization after 2 days' standing. From the liquid 2.726 g. of crystals are obtained melting at 62–63° C. and 0.750 g. of crystals melting at 79–90° C.

The crystals melting at 62–63° C. are repeatedly recrystallized by dissolving them in warm ether and replacing the ether by petroleum ether at the boiling point of the liquid. In this manner 2.57 g. of colourless crystals are obtained the melting-point of which does no longer alter after further recrystallization. The crystals have the shape of prisms. Their melting point is 66–67° C. The formula of the thus obtained methyl-O-methyl elenolate is $C_{13}H_{18}O_6$. The substance shows a rotation of $(\alpha)_D^{21}$ (in chloroform) of $-35.4°$. $\lambda_{max}$ (in absolute alcohol): 234 m$\mu$, $\log_e$: 4.08. Dissolved in methylene chloride the compound shows bands, in the infrared spectrum, at 3.43, 3.54, 5.77, 5.87, 6.10, 6.95, 8.35, 8.53, 8.98, 9.28, 11.27, and 12.03$\mu$. In a solution of carbon disulphide another band can be observed at 13.07$\mu$.

The crystals melting at 79–90° C. are recrystallized from mixtures of ether and petroleum ether, in the manner as described above. Eventually they are recrystallized from methanol, in which 600 mg. of colourless crystals are obtained in the form of prisms. The formula of the thus obtained methyl-O-methyl elenolate is $C_{13}H_{18}O_6$. The substance shows a rotation of $(\alpha)_D^{21}$ (in chloroform) of $-363.0°$; melting point 95–96° C. $\lambda_{max}$ (in absolute alcohol): 237 m$\mu$, $\log_e$: 4.07. Dissolved in methylene chloride, the compound shows bands, in the infrared spectrum, at 3.40, 3.51, 5.77, 5.87, 6.10, 6.93, 8.45, 8.85, 9.10, 10.85, 11.15, 11.83, and 12.28$\mu$. In a solution of carbon disulphide another band is observable at 13.04$\mu$.

So in this manner two stereo-isomeric methyl-O-methyl elenolates have been prepared with melting-points of 66–67° C. and 95–96° C., respectively.

Ethyl-O-ethyl elenolate is obtained in a corresponding manner while making use of ethanol instead of methanol.

EXAMPLE XIX

Methyl Acetals of Elenolic Acid 325.4 mg. of the methyl-O-methyl elenolate melting at 66–67° C., prepared according to Example XVIII, are dissolved in 32 ml. of absolute methanol. After the addition of 6.50 ml. of 0.5044 N potassium hydroxide solution the mixture is refluxed for 2 hours. Then the mixture is neutralized with phenol-phthalein as an indicator. After the addition of one drop of 0.5044 N potassium hydroxide solution, the solution is extracted three times with chloroform. After separation of the chloroform the aqueous layer is acidified with hydrochloric acid, after which the mixture is again (five times) extracted with chloroform. The chloroform extract is washed till neutral reaction, dried and evaporated to dryness.

In this manner 270.4 mg. of a somewhat sticky crystalline product are obtained, which are washed with an ice-cold mixture of ethyl acetate and petroleum ether (1:3) and recrystallized, until the melting point remains constant, from ether-petroleum ether in the manner described in Example XVIII.

Obtained are 120 mg. of colourless crystals of the methyl acetal of elenolic acid of the formula $C_{12}H_{16}O_6$; melting-point 114–115° C.; $(\alpha)_D^{21}$ (in chloroform): −29.6°; $\lambda_{max.}$ (in absolute alcohol); 235 m$\mu$; log$_e$: 4.02. Dissolved in methylene chloride, the compound shows bands, in the infrared spectrum, at 3.4 (broad), 5.88, 6.11, 6.95, 8.35, 8.53, 8.98, 9.28, 11.28, and 12.05$\mu$.

In this same manner 150 mg. of methyl-O-methyl elenolate melting at 95–96° C. are hydrolyzed, yielding 45 mg. of the methyl acetal of elenolic acid melting at 127–128° C. and of the formula $C_{12}H_{16}O_6$. The compound shows a rotation $(\alpha)_D^{21}$ (in chloroform) of −378.5° C.; $\lambda_{max.}$ (in absolute alcohol): 238 m$\mu$, log$_e$: 4.06. Dissolved in methylene chloride the compound shows bands, in the infrared spectrum, at 3.4 (broad), 5.88, 6.12, 6.95, 8.47, 8.87, 9.13, 10.86, 11.11, 11.82, and 12.30$\mu$.

In the same manner, starting from ethyl-O-ethyl elenolate, are obtained the ethyl acetals of elenolic acid.

I claim:

1. The sodium salt of elenolic acid having the formula:

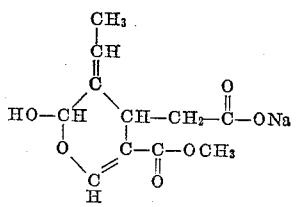

2. The potassium salt of elenolic acid having the formula:

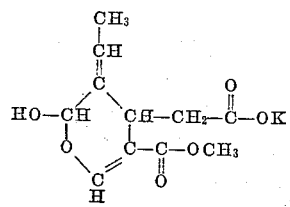

3. The ammonium salt of elenolic acid having the formula:

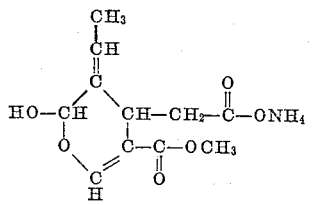

4. The calcium salt of elenolic acid having the formula:

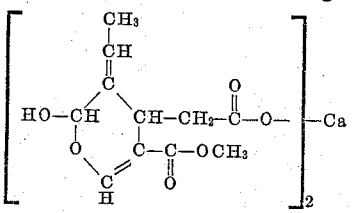

5. The magnesium salt of elenolic acid having the formula:

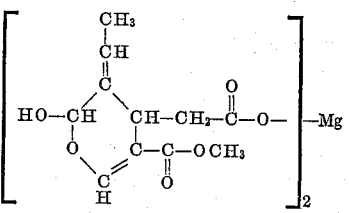

6. The zinc salt of elenolic acid having the formula:

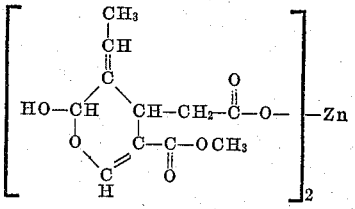

7. The iron salt of elenolic acid having the formula:

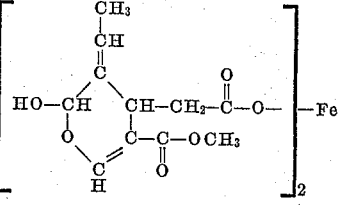

8. An ether-ester of elenolic acid having the formula:

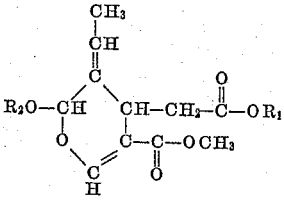

wherein $R_1$ and $R_2$ are unsubstituted lower alkyl groups.

9. Methyl-O-methyl elenolate having the formula:

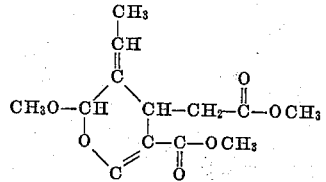

10. Ethyl-O-ethyl elenolate having the formula:

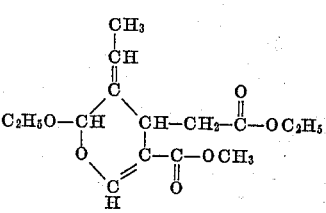

References Cited in the file of this patent

Samuelsson: Pharm. Revy, vol. 50, pp. 230, 231, 238 and 239 (1951).